United States Patent [19]
Kikinis

[11] Patent Number: 5,929,849
[45] Date of Patent: *Jul. 27, 1999

[54] INTEGRATION OF DYNAMIC UNIVERSAL RESOURCE LOCATORS WITH TELEVISION PRESENTATIONS

[75] Inventor: Dan Kikinis, Saratoga, Calif.

[73] Assignee: Phoenix Technologies, Ltd., San Jose, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/642,105

[22] Filed: May 2, 1996

[51] Int. Cl.$^6$ .................................................. H04N 7/173
[52] U.S. Cl. ............................... 345/327; 348/10; 455/6.2
[58] Field of Search ..................................... 348/7, 12, 13, 348/10, 11, 6; 455/3.1, 4.2, 5.1, 6.1, 6.2, 6.3; 395/762, 774, 936, 357, 327, 328; 345/327, 328; H04N 7/16, 7/173

[56] References Cited

U.S. PATENT DOCUMENTS

| | | | |
|---|---|---|---|
| 5,416,508 | 5/1995 | Sakuma et al. | 348/3 |
| 5,418,576 | 5/1995 | Ross | 348/686 |
| 5,438,355 | 8/1995 | Palmer et al. | 348/1 |
| 5,570,295 | 10/1996 | Isenberg et al. | 364/514 R |
| 5,572,643 | 11/1996 | Judson | 395/793 |
| 5,625,781 | 4/1997 | Cline et al. | 395/335 |
| 5,640,193 | 6/1997 | Wellner | 348/7 |
| 5,694,163 | 12/1997 | Harrison | 348/552 |
| 5,708,845 | 1/1998 | Wistendahl et al. | 395/806 |
| 5,761,606 | 6/1998 | Wolzien | 455/6.2 |
| 5,774,664 | 6/1998 | Hidary et al. | 395/200.48 |

OTHER PUBLICATIONS

"Joining Television and the Internet Using Java", Internet Week, V.2 No. 14, Apr. 1, 1996
"Scots To Try Internet TV", Electronic Engineering Times, p. 20, Mar. 11, 1996.

Primary Examiner—Chris Grant
Attorney, Agent, or Firm—Donald R. Boys

[57] ABSTRACT

A display system receives a data stream having successive image frame data in frame regions and Internet Universal Resource Locator (URL) data and association data in data regions between frame regions, and displays on a display monitor successive frames derived from the image frame data. The association data associates one or more image entities in successive frames with one or more URLs, and a viewer, by selecting an associated image entity in the display, causes the system to access the Internet, to connect to a source on the Internet associated with the URL, to download a WEB page from the source, and to display the WEB page in the display. The viewer may interact with the displayed WEB page to access further related information. Entities may be enhanced in the display to indicate association with a hidden URL.

34 Claims, 6 Drawing Sheets

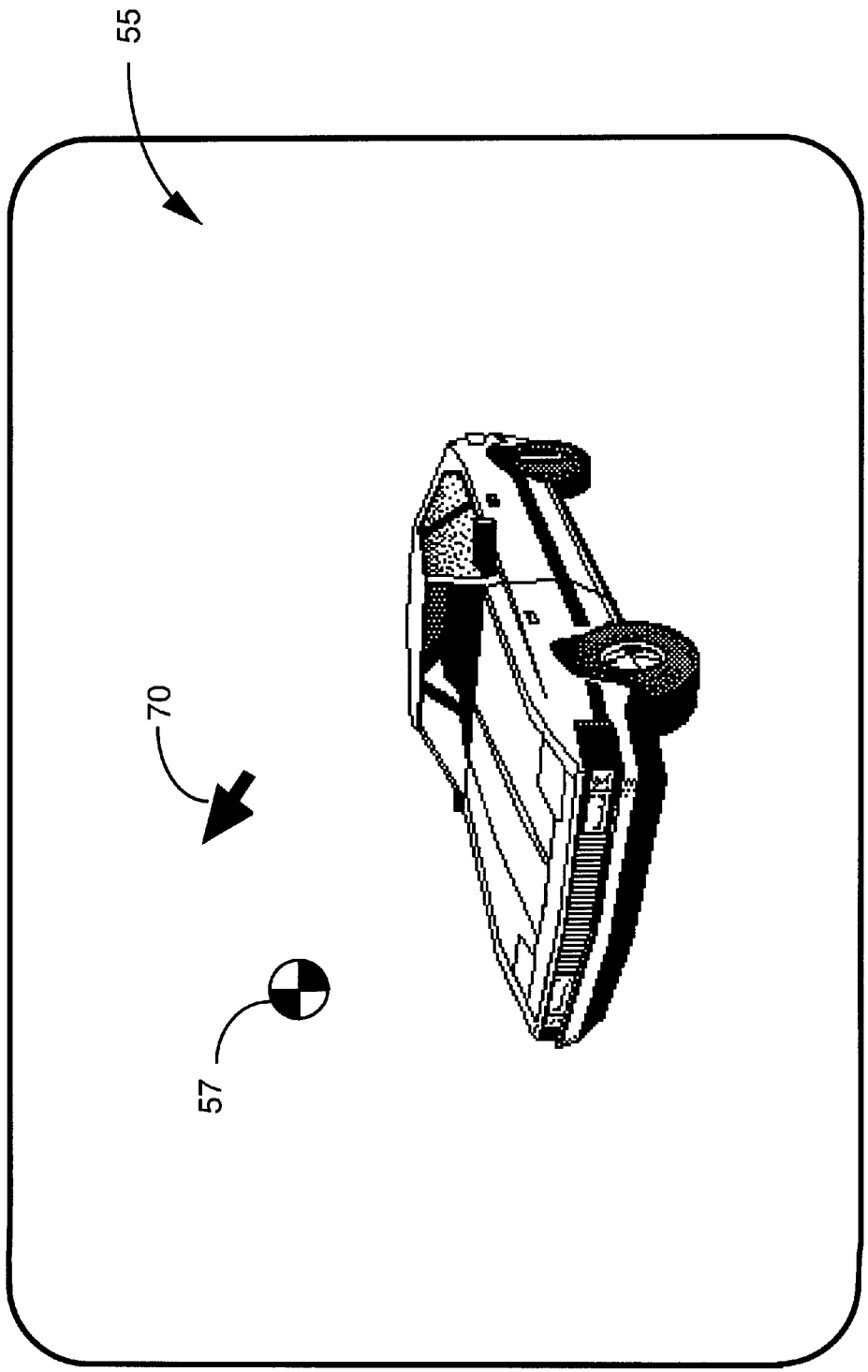

INTEGRATION OF DYNAMIC UNIVERSAL RESOURCE LOCATORS WITH TELEVISION PRESENTATIONS

FIELD OF THE INVENTION

The present invention is in the area of multimedia apparatus and methods, and pertains more particularly to integrating Internet access with TV transmission and display to provide TV viewers with supplementary information regarding displayed entities and the like.

BACKGROUND OF THE INVENTION

With continuing development of new and better ways of delivering television and video presentations to end users, and parallel development of computerized information systems, such as the Internet and the associated World Wide Web (WWW), there have been concerted efforts to integrate various systems to provide enhanced information and entertainment systems. For example, developers are introducing integrated systems combining TVs with computer subsystems, so a TV may be used as a WEB browser.

In some systems computer elements, such as a CPU, memory, and the like, are built into the familiar chassis of a TV set. In such a system, the TV screen becomes the display monitor in the computer mode. In such a system, conventional TV elements and circuitry are incorporated along with the computer elements, and capability is provided for a user to switch modes. One may thus, with a properly equipped system, select to view analog TV programs, digital TV programs, conventional cable TV, satellite TV, pay TV from various sources, and browse the WWW as well, displaying WEB pages and interacting with on-screen fields and relational systems for jumping to related information, databases, and other WEB pages.

In some other systems, computer elements are provided in an enclosure separate from the TV, termed in the art a set-top box. Set-top box systems have an advantage for providers in that they may be connected to conventional television sets, so end users don't have to buy a new TV along with the computer elements.

In such integrated systems, whether in a single enclosure or as set-top box systems, user input is typically through a hand-held device quite similar to a familiar remote controller, usually having infra-red communication with the set-top box or a receiver in the integrated TV. For computer mode, such as WEB browsing, a cursor is displayed on the TV screen, and cursor manipulation is provided by buttons on the remote. Select buttons are also provided in the remote to perform the familiar function of such buttons on a pointer device, like a mouse or trackball more familiar to computer users.

Set-top boxes and computer-integrated TVs adapted as described above typically have inputs for such as a TV antenna (analog), cable TV (analog or digital), more recently direct-satellite TV (digital), and may also connect to mass storage devices such as hard disk drives and CD-ROM drives to provide a capability for uploading video data from such drives and presenting the dynamic result as a display on the TV screen.

The present inventors have noted that with the coupling of computer technology (digital) with TV, many capabilities familiar to computer users have been made available to TV users. For example, ability to provide text annotation for TV presentations is considerably enhanced. Computer techniques such a Pix-on-Pix are now available, wherein separate TV presentations may be made in separate windows, or overlaid windows on the display screen. Separate windows may also support display from separate sources, such as an analog TV program in one window, a computer game in another, and a video conference in a third.

Still, with all of the digital techniques made available, an essential separation still remains between the computer world and the dynamic TV world. Consider, for example, how a need or desire for information occurs to an end user. A person watching a TV program identifies with a particular performer. The viewer may not remember the performer's name, but might be very interested for a time in recalling the name, and even in gathering further information about the actor or actress.

Conventionally in this situation, the viewer can wait until the end of the program, where the credits are typically displayed, usually unreadable, note the name of the performer, then (assuming an integrated system) switch modes to Browse, access the WWW, and search the performer's name, the studio name, the program name, or some other criteria, to seek the desired information. If the information desired is available somewhere in a WEB page or related database, the user may, after some effort, be able to satisfy his/her desire for the information.

One more simple example should suffice. Given a TV advertisement, a viewer may be thoroughly enamored by an advertisement for a particular item such as an automobile, and wish to purchase the item or one much like it. Given the cost of network television advertising, and the necessary time limitations imposed on purchasers of advertising time as a result, the depth of information provided about purchasing an advertised item is necessarily limited. Certain salient features may be provided, typically those that an advertiser presumes will attract a purchaser, and some general pricing information may be provided as well.

Assuming an automobile advertisement as an example, full detail of options, models, availability, pricing and financing details, and where one might go locally to examine and test drive a model of the car could not be provided. Moreover, even if full detail were provided, the viewer would have a hard time trying to write it all down for future use. See, for example, the fine print on automobile lease advertisements.

In most cases a viewer sold by a TV advertisement has to make some determined effort to actually complete a purchase of the advertised item, except for the questionable case of TV shopping channels, which are not presumed by many to be credible. Moreover, many major manufacturers do not offer products to be sold by the conventional phone-in TV shopping technique.

What is clearly needed is a further integration of the techniques of WEB browsing and TV transmission to provide a method and apparatus for a viewer to very quickly garner maximum information about entities of interest seen in TV transmissions. A method allowing a viewer to quickly and easily access information in detail about products advertised at a more general level, and about people and things of interest identified in TV transmissions.

SUMMARY OF THE INVENTION

In a preferred embodiment of the invention a varying signal for providing a display on a display monitor is provided, comprising a first region comprising image information for a single frame for the display; and a second region separate from the first region, the second region comprising information relating a visual entity in the display provided by the information in the first region to an Internet Universal Resource Locator (URL). The second region may also comprises information relating the visual entity to a specific position in the single frame display. The signals in the first region may be either analog or digital in nature. The second region may also comprise information for causing the visual entity to be visually enhanced in the display, such as by alteration of contrast, brightness, or color signals, or some combination of these.

In an alternative embodiment a system is provided for TV transmission and display of television programming, comprising a source providing a data stream having image frame data in one region and a dynamic Internet Universal Resource Locator (URL) in a separate region, the URL related to an image entity in a display provided by the image frame data; and receiving and display apparatus adapted for receiving and displaying the image frame data on a display monitor, the receiver and display apparatus comprising also an Internet Browser. In this embodiment the receiver strips the URL from the region separate from the region comprising the image frame data, activates the Internet Browser, accesses a World Wide Web home page associated with the URL, and displays the home page on the display monitor.

In the system embodiment just described, the URL may be associated with an image entity in a frame displayed from the image frame data, or more than one entity may be associated each with a different URL. Also the image entity may be enhanced in the display to indicate to a viewer that the entity is associated with a URL. Enhancement can be by one or more of adjusting brightness or contrast, by adjusting color, or by adding an outline to the entity.

The source in such a system may be a broadcast transmitter broadcasting a TV signal, a Video Cassette Recorder (VCR) playing a VCR tape, a CD-ROM drive playing a CD-ROM disk, or a computer apparatus retrieving and transmitting a data stream from a hard disk drive. The WEB page retrieved and displayed may take up the entire display, or may be displayed as a movable and adjustable window on the display monitor.

In other embodiments a receiving and display apparatus is provided comprising computerized control circuitry; data stream receiving and processing circuitry; an Internet browser; display circuitry; and a display monitor. The receiving and processing circuitry receives a data stream having image frame data and an Internet Universal Resource Locator (URL) identifying an Internet source and provides the image frame data to the display circuitry and the URL to the control circuitry. The display circuitry provides a display on the display monitor from the image frame data, and the control circuitry accesses the Internet, causes the Browser to access the Internet source, and downloads and displays a WEB page from the Internet source.

In this receiving and display apparatus the URL is associated with a specific entity image in the display. There may also be multiple URLs associated each with a different specific entity image in the display. The WEB page retrieved is displayed as a movable and adjustable window in the display in a preferred embodiment, but may also be displayed in place of the previous display.

In another aspect of the invention a signal preparation and transmission apparatus is provided comprising imaging apparatus for monitoring a scene and preparing a signal data stream therefrom, the data stream comprising image frame data; and control circuitry adapted for adding an Internet Universal Resource Locator URL to the data stream and for associating the URL with an image entity in one or more of the image frames. There may also be more than one URL each associated with a different image entity. Visual enhancement of the image entity in a display provided by the data stream may be provided as well, such as by one or more of adjusting brightness, contrast, or color.

In another aspect a method is provided for association of an entity in a broadcast image with an Internet Universal Resource Locator (URL), comprising steps of (a) preparing a data stream having frame data regions comprising sequential frame data from a scene using a visual imaging apparatus; (b) inserting data for the URL in second regions between the frame data regions; and (c) inserting data relating the URL to a specific entity in an adjacent frame data region in the second regions between the frame data regions.

In this method steps (b) and (c) may be steps performed in editing pre-recorded image data, or, alternatively, steps performed automatically in a live broadcast by computerized apparatus coordinated with the visual imaging apparatus. There may additionally be a step for inserting data in the second regions for enhancing display of the entity.

In yet another aspect a method is provided for associating an entity in an image displayed from a broadcast data stream with an Internet Universal Resource Locator (URL), comprising steps of (a) displaying image frames derived from a data stream having image frame data; (b) acquiring the URL and association data from data regions separate from but interleaved with the image frame data; and (c) associating the entity in successive image frames with the acquired URL according to the association data.

In this method there may be a further step of visually enhancing the entity in the successive image frames such as by adjustment of one or more of color, brightness, or contrast in the display.

In still a further aspect of the invention a method is provided for accessing additional information related to an image entity in a video display, comprising steps of (a) associating the image entity with a dynamic Universal Resource Locator (URL) transmitted between frames in a data stream including image frames for the video display; (b) selecting the entity in the video display by user input: (c) accessing the Internet via a Network Interface Module (NIM) in response to the user input, and connecting to the data source associated with the URL; (d) downloading a WEB page from the data source; and (e) displaying the WEB page in the video display.

In this further method provided the WEB page may be displayed in the video display as a movable and adjustable window, or may take up the entire display. User selection is preferably by cursor manipulation and selection with a pointer device. Multiple image entities may be associated each with a unique URL, and more than one WEB page may be accessed and displayed by selecting more than one image entity.

The present invention in its many aspects and embodiments provides a very user-friendly ability to access information not normally provided in television and other video displays, and affords a new tool for advertisers and promoters. It also conveniently bypasses time-consuming and laborious tasks for a viewer who wishes additional information from such displays and presentations.

BRIEF DESCRIPTION OF THE DRAWINGS

FIG. 2A is an exemplary TV display according to an embodiment of the present invention.

DESCRIPTION OF THE PREFERRED EMBODIMENTS

In embodiments of the present invention, individual images in TV presentations, such as persons, objects, and the like, are linked with Universal Resource Locators (URLs) in a manner that a viewer may select such images, and by so doing, invoke a linked URL, which leads to a WEB location providing information related to the image. In most embodiments of the invention an image related to a URL is enhanced in display, such as by a special color, an enhanced brightness (a halo), or an outline. Other forms of enhancement are possible as well.

Figure 1:
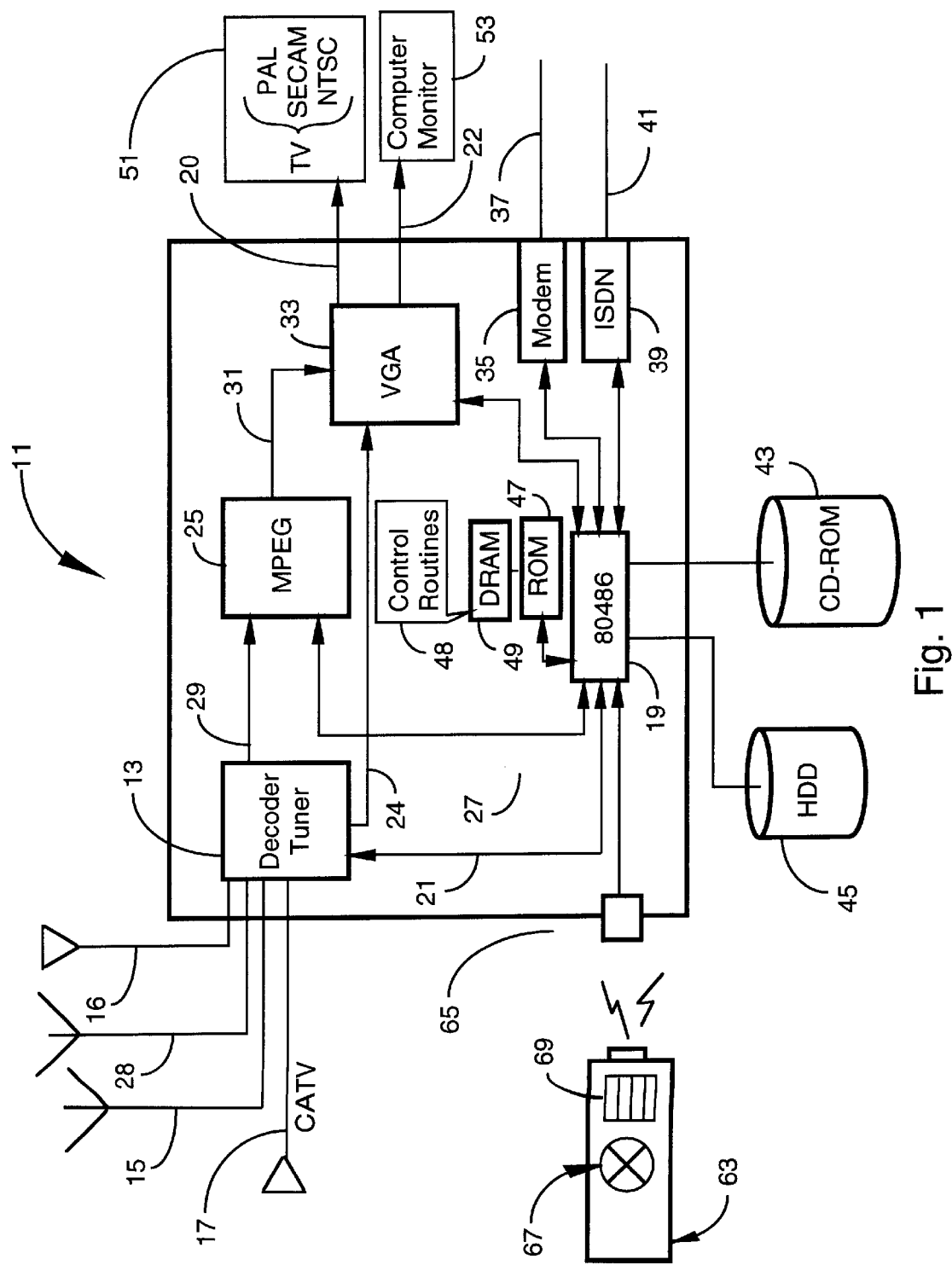
FIG. 1 is a block diagram of a set-top box as may be used as a platform for practicing the present invention.

FIG. 1 is a block diagram of a set-top box 11 as may be used for practicing the present invention. Set-top box 11 is more sophisticated and has more functionality than required for practicing the invention in some embodiments, but serves as a good example of the sort of platform that may be used.

In box 11 a decoder/tuner 13 receives signals from a variety of sources, such as a satellite link 15, a cable TV line 17, and a VCR input 16. An 80486 CPU 19 in this embodiment provides management and computing ability, and is connected to decoder/tuner 13 by link 21. In other embodiments other CPUs may be used. Decoder/tuner 13, accepts and decodes satellite signals on link 15, Cable TV signals on line 17, and VCR video signals on line 16.

In addition to the CPU and decoder/tuner in set-top box 11, there is a Motion Picture Experts Group (MPEG) decoder 25 for interpreting data provided to the set top box in MPEG I and MPEG II format, or future formats, and for providing signals therefrom to drive a TV or a video monitor. MPEG is an industry standard protocol for video data, and is well known in the art.

MPEG decoder 25 is coupled to CPU 19 by link 27 and to decoder/tuner 13 by link 29. MPEG decoder 25 has an output line 31 to a video graphics adapter (VGA) chip or chip set 33, including video ram (VRAM). The VGA chip set is adapted for driving a TV screen or a computer display screen via conventional circuitry. Other sorts of video circuitry might be used.

An analog telephone modem 35 connects to a telephone line 37 and to CPU 19, providing communication with a remote location for pay-TV transactions and diagnostic and downloading services. An optional ISDN interface 39 in this embodiment connects to an optical digital data cable 41 and to CPU 19 for digital telephone communication, which may be used instead of or in addition to analog modem 35. There are optional interfaces provided also for a compact-Disk Read-Only Memory (CD-ROM) drive 43 and a hard disk drive 45. The modems depicted here are convenient, and are examples of Network Interface Modules (NIMs) that may be used for Internet access.

Set-top box 11 has a ROM 47 for such as BIOS functions, and also dynamic random access memory (DRAM) 49. Operating code 48, stored in DRAM 48, provides functionality according to embodiments of the invention, and may be recorded in any conventional manner accessible and executable by CPU 19. Code 48 includes a WEB browser, and routines for specific functionality according to embodiments of the invention, described more fully below. The WEB browser is adapted to access servers on the WWW, such as server 54 shown connected to link 37. Server 54 is meant to represent any WEB server that may be dialed up through one of the modems associated with the system of FIG. 1.

It will be apparent to those with skill in the computer arts that the communication links indicated in FIG. 1 for set top box 11 are illustrative of data flow, and are not meant to indicate the type or bandwidth of specific links. It is well known, for example, that CPUs of the sort described communicate on parallel buses with bus cycles controlled by bus controllers in an industry standard fashion, such as an ISA bus, an EISA bus, and the like. Other sorts of communication links may be used, such as Universal Serial Bus (USB) and others.

In the set-top box of FIG. 1, VGA circuitry 33 has outputs finks 20 and 22 for driving a TV 51 and/or a computer display monitor 53, and display in various embodiments may be made on either or both. There is also an infra-red communicating remote 63 adapted for conventional remote functions and also for cursor control and selection by directional buttons 67 and selection buttons 69. Infra-red communication from remote 63 is to receiver 65 in the set-top box.

As is well known in the art, data stream transmissions made for the purpose of presenting images on a display screen are sent in identifiable frames. This is generally true whether the origination is a stored (pre-recorded) data stream, or a live transmission, and whether the transmission is digital or analog. The specific technology in any case is very well known in the art, and not necessary to cover in detail in this specification.

In frame-by-frame transmissions, as is known in the art, it is known to transmit information in the space between frames. The format of digital transmissions allows for such data, and analog TV transmission has blank lines between frames which may also be used for data transmission within certain space and time limitations. Information for colorizing black-and-white TV presentations is coded in this manner, as are special captions for hearing handicapped, for example.

In various embodiments of the present invention one or more entity images in frames of a transmission are identified as to position and extent in the frame, and are associated with a WWW URL. As a simplified example, in an advertisement for a certain brand of automobile, an icon or emblem may be presented in each frame at a particular position in the frame. The emblem could be, for example, the specific emblem used for that brand of automobile, like the well-known Ford™, Chevrolet™, of BMW™ emblem. The emblem could be provided in the advertisement in any of the conventional manners known in the art. FIG. 2A is a simplified depiction of a frame 55 displayed with a BMW emblem 57 in the frame at a particular position with a specific areal extent.

In this example the BMW advertisement is a pre-recorded advertisement that may be transmitted any number of times and displayed, just as advertisements are typically displayed between portions of TV programs. In the recording of the advertisement, or in an editing procedure for existing pre-recorded advertisements, data is recorded to be transmitted between frames identifying the position and extent of the BMW emblem in the adjacent frame, and associating the emblem with a specific WWW URL, of the general form http://www.bmw.com. The URL is a locator on the WWW for a Home Page provided on a WEB server maintained by BMW, and being a repository for detailed information in addition to that provided in the transmitted advertisement.

In alternative embodiments of the invention different entities in the a frame may be associated with different URLs, and may serve to direct the user to different home pages on the WEB, or to different data locations on the same home page. The car itself may be highlighted and associated with a URL as well as the emblem, and the car URL could lead to information on the latest model, in this example, perhaps http://www.bmw.com/latestmodel.

Figure 2B:
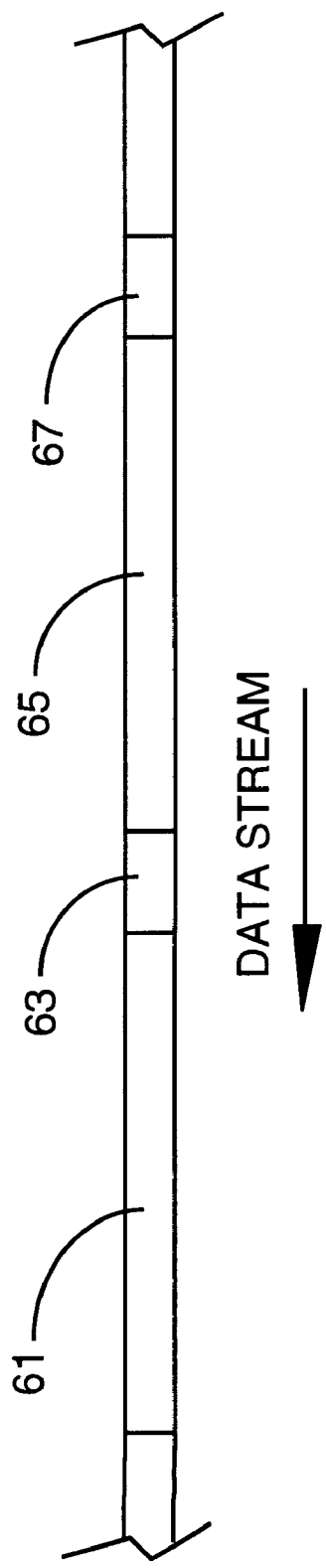
FIG. 2B is a representation of a data stream for transmitting a TV display in an embodiment of the invention as shown in FIG. 2A.

FIG. 2B is an illustration of a data stream 59 wherein data for a first frame 61 and a second, following frame 65 is separated by a data region 63 containing the data identifying the position and extent of BMW emblem 57 in frame 61. A next data region 67 follows frame 59 and identifies the position and extent of the BMW emblem in that frame as well, and carries the URL associated with the emblem as well. In this manner each frame has an associated data region with the image position and extent data, and the associated URL.

In conventional reception systems, wherein computer capability is not provided integrated with the TV capability, the additional data including the URL is not utilized, and passes transparently, as the data is between frames, and only the frame data is utilized in such conventional TV-only systems. However, in a system of the sort described with the aid of FIG. 1., wherein computer functions have been integrated with TV functions, the data between frames can be utilized in a special way.

In a system with a CPU and a memory, and also equipped with special control routines according to an embodiment of the invention, the BMW emblem is treated as an interactive screen region in a manner familiar to persons who use access WEB pages. The computer system integrated with the TV circuitry displays a cursor 70 on the screen which may be positioned by a user via positioning buttons 67 on hand-held remote 63 (see FIG. 1). In other systems, cursor control may be accomplished by a pointer device or in another convenient manner.

Continuing with the example of the BMW advertisement, as the TV frames are displayed, which includes BMW emblem 57, a viewer may activate the cursor (cursor may activate automatically when the viewer manipulates one or another of buttons 67). Following special control routines according to an embodiment of the invention, data between frames is stripped and used in execution of the control routines to identify the position and areal extent of emblem 57 in the adjacent frames, and the associated URL.

If the viewer is interested in additional information, he/she may manipulate the cursor to touch the region of emblem 57 and then actuate a selection signal, such as pressing one of the buttons 69 on the remote. On receipt of the selection signal with the cursor touching the BMW emblem, the system executes browser routines, accessing the WWW, and dials up the WEB server (see server 54 and modem 35 or 39, FIG. 1) described above maintained by BMW on the WWW. The URL in the data region between frames of the TV transmission, associated with the BMW emblem is the WWW address for dial-up.

Figure 2C:
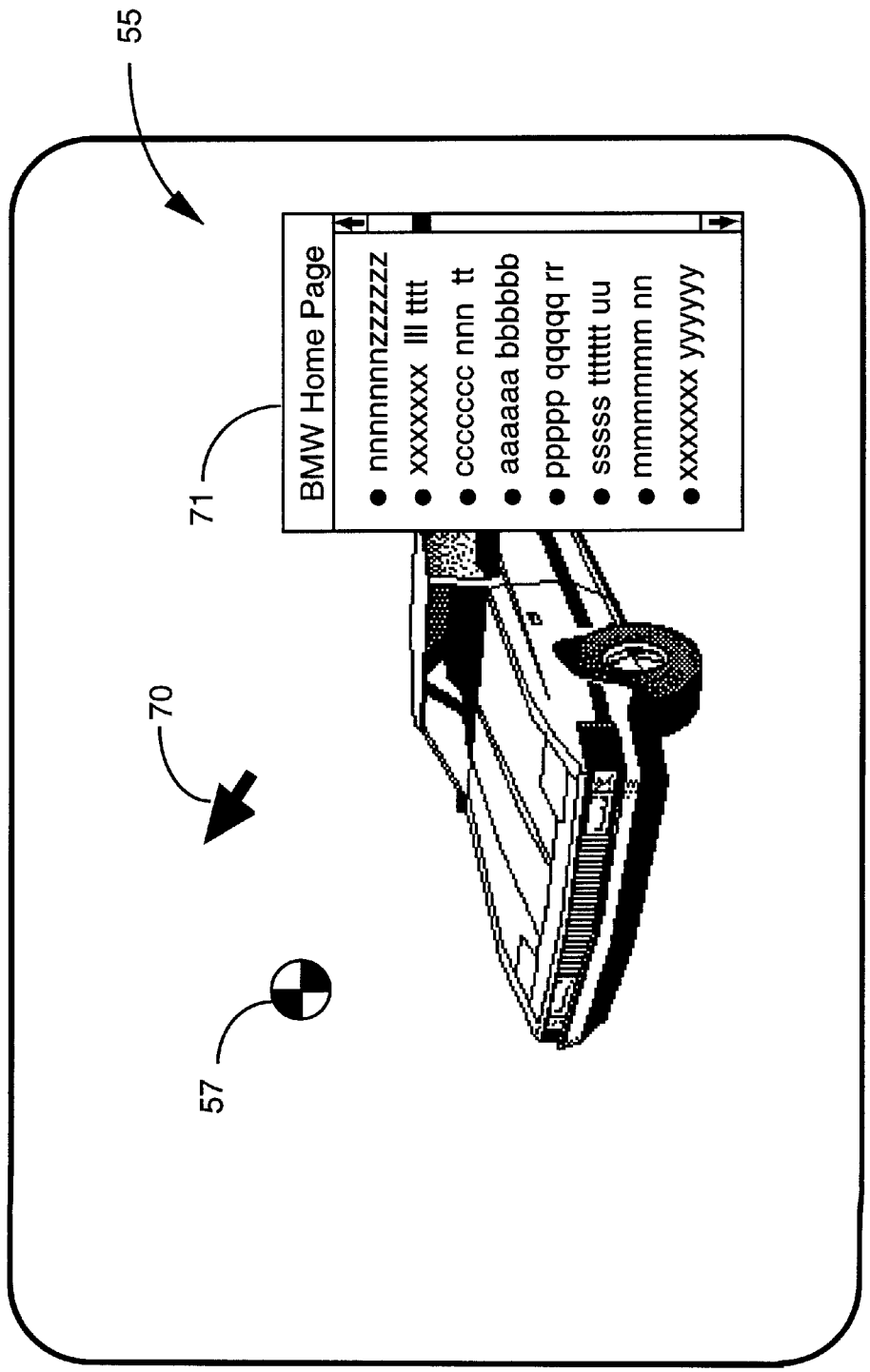
FIG. 2C is an exemplary display showing a WEB page in a window on a TV display as might be presented as a result of practicing the present invention.

Once a viewer activates the system of the invention, and connection is made to the BMW WEB server, action may proceed in one of several ways. In one embodiment, the TV display is suspended, and the initial WEB page downloaded from the BMW server is displayed instead. Preferably, the TV display continues, and the WEB page downloaded is displayed in a window 71 over the TV display as shown in FIG. 2C. In this manner, window 71 can be enlarged or downsized, moved on the screen, and closed whenever the viewer wishes. Also, interactive areas in the window relating to additional information or related WEB pages can be activated with cursor 70 and selector buttons 69, just as though the WEB page in the superimposed window is a page displayed on a computer monitor via a conventional WEB browser. This capability includes ability to scroll via scroll bars and the like as commonly presented with WEB pages on the WWW. In some embodiments, due to areal limitations for display, rather than sizing a WEB page to a window for display, the WEB page is maintained at a certain minimum size, and if the window is too small to show all of the WEB page, scanning and panning capability is provided as known in the art for accessing the entire page.

The BMW WEB page shown in window 71 of FIG. 2C is an information portal for the TV viewer to access an abundance of information via the WWW, but not available in the original TV advertisement. Such information might include, for example, colors available (with examples)., body styles (with pictures), performance data, detailed pricing structure, sales and lease terms available, locations near the viewer where a demonstration drive may be accomplished and company representatives may be interviewed, and much more. Even demonstrative videos may be downloaded and played for the viewer, if the system is equipped to display such information. Further, and importantly, a pre-filled order form may be accessed. The process of buying a dealer's product can be made painless and user/buyer friendly.

In addition to simply accessing additional information, the two-way capability of Internet links allows a viewer, through WEB page access, to send information to the server via input fields, assuming, of course, that the system at the viewer's command has text input capability, such as at least a minimum keyboard.

The example presented herein of a BMW automobile advertisement is but one special application in the scope of the invention. In variations of this embodiment, the image region associated with an URL could be an image of the car, rather than the BMW emblem. The active image region could move in the presentation of the TV advertisement, and the interframe data would track the screen position and extent, so cursor movement could by coordinated with the dynamic image in real time.

In addition to tracking and coordinating a dynamic image, the dynamic image may be enhanced in the display in a manner to indicate to the viewer that the dynamic image is a related region for access for further information. This may be done by outlining in some fashion on the screen, brightness and or contrast adjustment, color variation, or some combination of these or other techniques.

In this manner any image in a TV transmission may be associated, according to embodiments of the present invention, with a dynamic URL for accessing additional information related to the image.

In a minimum embodiment, a URL may be associated in an interframe region, as described above, and, upon selection of the image, the URL may be displayed on the screen as text information for the viewer to remember or copy. The URL may also be downloaded to a memory device for later printout or use in browsing.

There are an almost endless list of adaptations and embodiments of this invention. The example of the BMW advertisement is a commercial application, and one may imagine a multitude of such commercial advertising applications.

In other embodiments, for example, in TV programs other than advertisements, actors and actresses may be associated with URLs which will lead to WEB pages with information such as other movies or presentations featuring the same person, biographical information, availability and preferences for additional work (for agents and the like). In politics, positions on issues, coming rallies and campaign stops, and the like may be accessed from political spots having an active region according to the invention. In sports events, information about particular athletes may be provided, and information about schedules, upcoming contests, records, chances of playoff positions, and the like may be presented. Sports organizations may also present season ticket prices and the like, and even accomplish sales over Internet links.

Figure 3A:
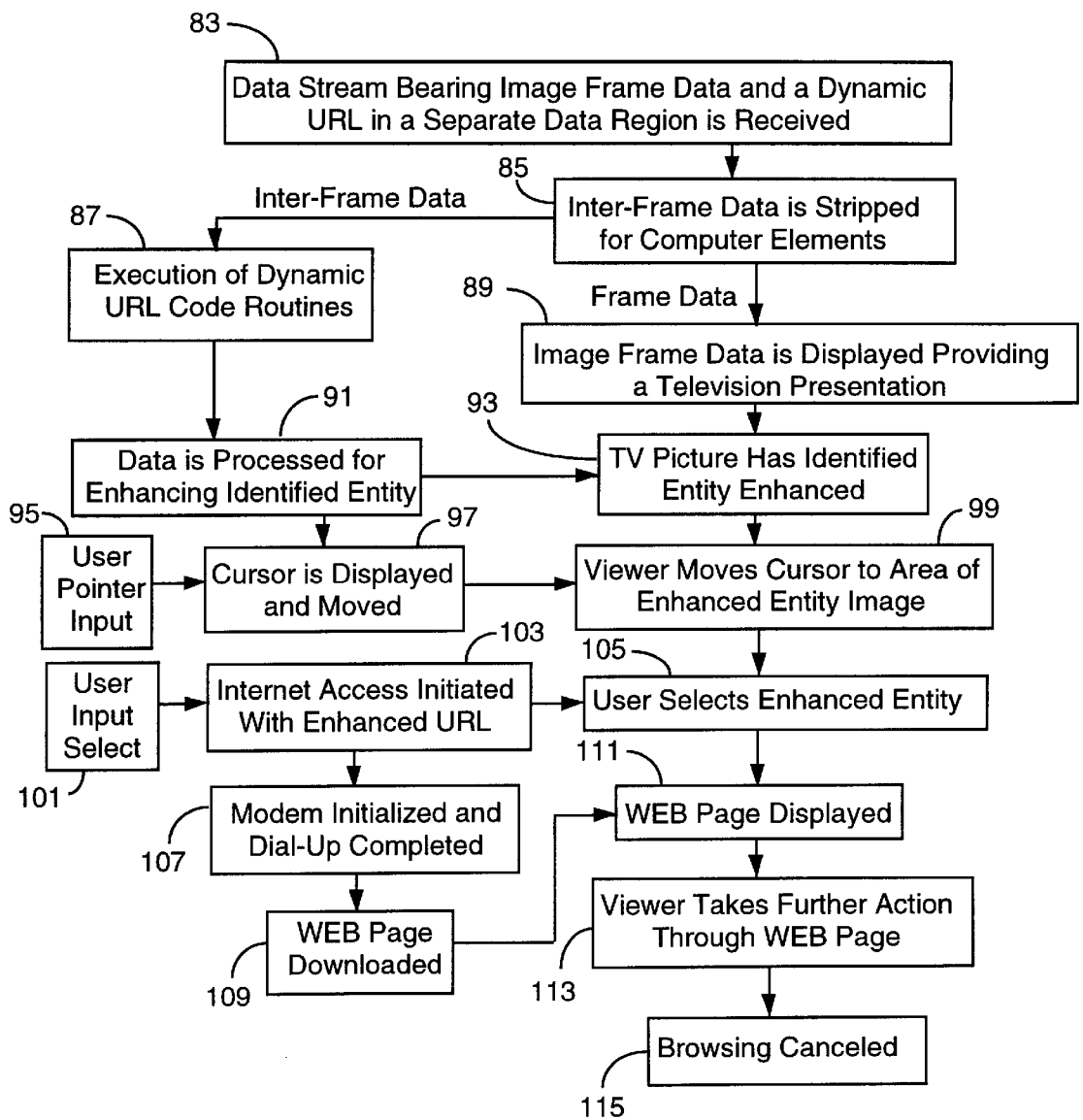
FIG. 3A is a flow diagram depicting steps in preparing a TV transmission according to an embodiment of the present invention.

FIG. 3A is a flow diagram depicting a procedure followed by an apparatus in conjunction with a data stream containing a dynamic URL in conjunction with an embodiment of the present invention.

At step 83 a data stream is received bearing entity data and one or more dynamic URLs in a data region separate from image frame data. The one or more URLs are linked to the image entities by a tag. The URLs can be sent before (ahead of) the images and stored in a cache. Thus, when many images are displayed at the same time, more bandwidth can be alloated to the entities, as opposed to the URL data.

At step 85 interframe data is stripped and provided to computer elements in the receiving platform (see FIG. 1) to a CPU executing dynamic URL control routines according to an embodiment of the present invention at step 87. A normal TV picture is presented from the frame data at step 89 by the conventional TV elements of the receiving interactive system.

At step 91 data from the inter-frame regions is processed to enhance the identified entity, and the enhancement is accomplished at step 93. At step 95 a viewer provides pointer input to activate and manipulate a cursor on the TV screen. The input is processed at step 97, and at step 99 the viewer moves the cursor to the area of the enhanced entity image. At step 101 the viewer activates a selection input, which is processed at step 103, and at step 105 the enhanced entity is selected. This selection initiates WEB access by computer elements in the receiving and display system.

At step 107 a Network Interface Module (NIM) is initialized and dial-up is accomplished, providing Internet access for the receiving system. The NIM may be an analog or a digital modem, a cable modem, a satellite modem, one of computer network cards, such a 10bT, 100bT, Token Ring, or any of a number of other ways to access the Internet.

At step 109 the dynamic URL associated with the enhanced entity is presented on the Internet, and the associated WEB page is downloaded. The WEB page is displayed at step 111, either as the display or as a window on the display. Step 113 represents further action the viewer may take with the WEB page, selecting related information, jumping to related sites on the WWW, and interacting with the WEB page in general in any or all of the ways known to those with skill in the art. At step 115 the viewer deactivates the WEB display, which may be done by selecting a familiar close box, or by any of several other viewer input techniques.

The descriptions above relate principally to pre-recorded presentations for TV display, such as advertisements, programs to be delayed and repeated and the like. In such material editing may be done frame-by-frame adding the few bytes of information needed in between frames to relate one or more images in adjacent frames to a URL. Methods to accomplish such editing will be apparent to those with skill in the TV and data transmission arts. Similar techniques may be used with VCR media and CD-ROM media. No known method of recording and disseminating still or dynamic images for subsequent image display are excluded. MPEG data formats, for example, include means for including such data.

Figure 3B:
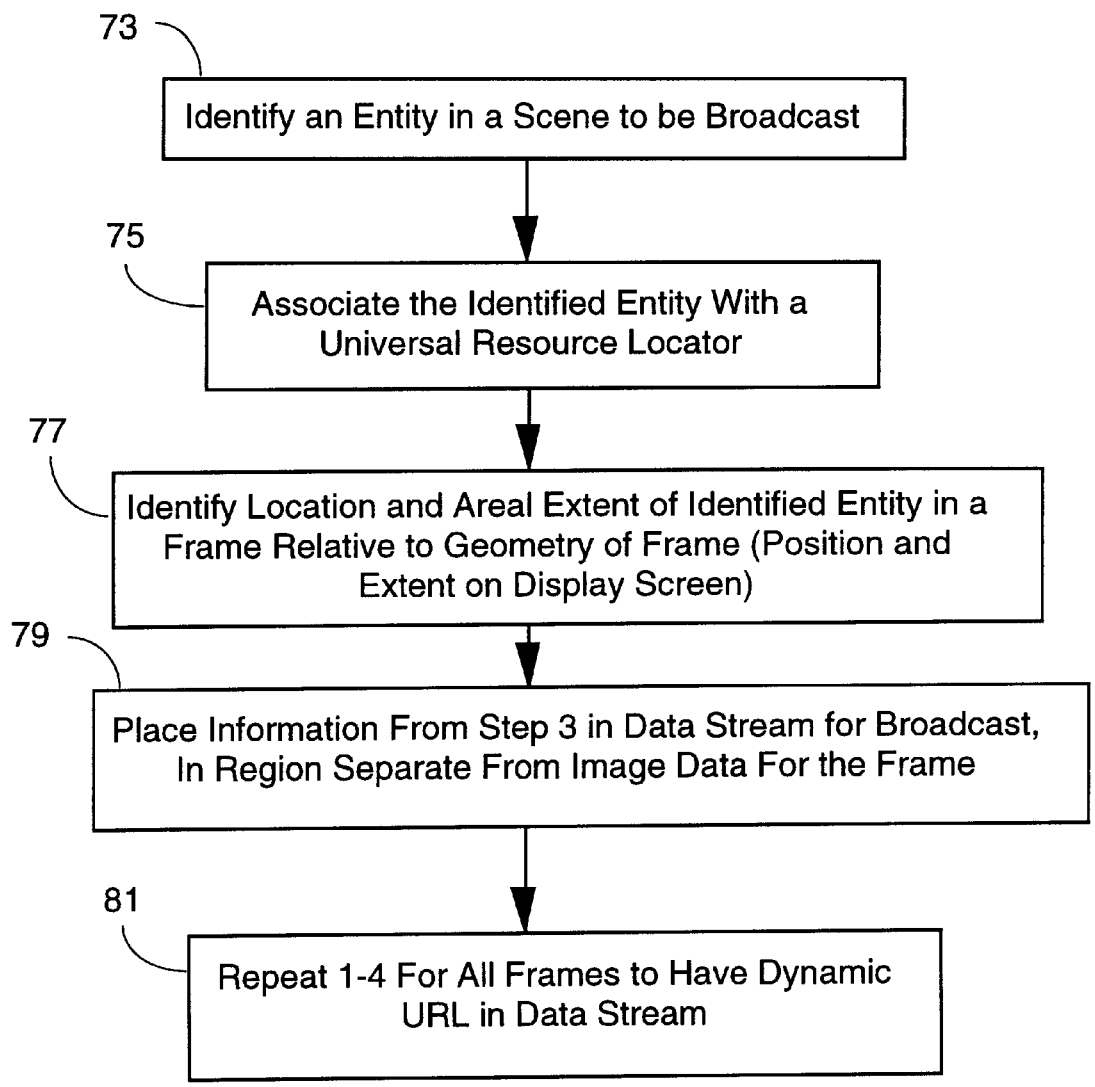
FIG. 3B is a flow diagram depicting steps in receiving a TV broadcast with a dynamic URL, in initiating access to a WEB page according to an embodiment of the present invention.

FIG. 3B is a flow diagram depicting general steps for preparing a TV transmission with a dynamic URL according to an embodiment of the present invention. At step 73 an entity, such as the BMW emblem in the example above, is identified in a scene to be broadcast, to be associated with a dynamic URL.

At step 75 the identified entity is associated with a URL. The URL will in most cases be for a WEB page maintained for the purpose of providing additional information related to the identified entity, or associated with the TV broadcast in a more general way.

At step 77 the location and, in many cases, the areal extent of the identified entity is identified for a broadcast frame relative to frame geometry. That is, the position and extent of the entity on a display screen.

At step 79 data defining the position and areal extent of the identified entity, and a URL to be associated with the entity, is recorded in a data region separate from the image data for display frame in the data stream for a broadcast. The separate data region is associated with the frame.

In step 81 steps 1–4 are repeated for all frames wherein an entity is to be associated with a dynamic URL. In most cases one entity will be repeated in a relatively large number of frames, so a viewer will have time to react and select a dynamic entity. In a single program or broadcast several entities may be thus associated with a single, or with several URLs.

Any entity is a candidate, and there are many possibilities. People may be selected, objects or artifacts, or added icons or images for example. In some cases the entity to be identified and associated with a URL is actually added to the scene by added data in the same region used for the URL. In some embodiments as well, a single (point) position is identified for an entity, and a general area, such as a circular area or a rectangular area is associated with the entity, to be the area which a viewer may select to initiate a dynamic URL.

The invention is not limited to pre-recorded and edited image data. Unique methods may be employed to provide the advantages of the present invention in live broadcasts, such as sports events and the like. In live broadcasts the data between frames, including a URL associated with an image, has to be inserted in substantially real time, or with a minimum delay. This means that the transmission equipment, meaning a camera and associated image and data processing apparatus, has to have a way of knowing which object or person being imaged is to be an URL-associated object or image, and the apparatus has to develop the data to be inserted frame-by-frame.

To accomplish real-time live broadcasts with dynamic URLs, an object or a person to be URL associated simply needs to be equipped with an apparatus capable of informing the separate imaging apparatus of the fact of association and position. In one embodiment this apparatus takes the form of a broadcaster, such as an infra-red transmitter or a radio beacon broadcaster.

A broadcast device as described accomplishes two essential purposes in transmission to the imaging apparatus. The first is positional, so the imaging apparatus may insert positional and areal extent data in the interframe region devoted to such information, and the second may be the URL itself. In some embodiments, the URL may be inserted automatically, as the URL will be common to an event rather than an object or person. In others, the URL is added specific to a tracked object or person. In the case of real-time live broadcast, the technique mentioned above, wherein a point location is identified and a standard areal extent is inserted, is a convenient method.

There are a number of convenient ways that the necessary information for dynamic URL inclusion may be provided by a person or an object being imaged by such as a TV camera. Infra-red and radio beacon are just two of many. In some embodiments bar codes on a players clothing may be used, the codes readable by the imaging apparatus. In others, alternative broadcast techniques may be used, such as X-Rays or UHF transmissions. Any method of transmitting information over a distance may be utilized.

It will be apparent to those with skill in the art that there are many alterations that may be made in the embodiments of the invention described without departing from the spirit and scope of the invention. For example, there are many manifestations of the apparatus described as an example with the aid of FIG. 1, that would be suitable for practicing the invention. All of the elements of FIG. 1 are not necessary to practice the invention in all embodiments, and in some embodiments only certain selected elements are needed. For example, the CD-ROM drive and hard-disk drive elements shown are not needed in most embodiments, but might be used in some embodiments.

In addition to the above, although TV broadcast from a remote location by any one of several methods, either live broadcast or pre-recorded, has been used primarily as examples for described embodiments above, the invention also encompasses other ways of providing TX signals to a display, and the integrated ability to respond to dynamic URLs. For example, TV programming with associated URLs may be provided on video tape to be used in a VCR, by signals stored on one of the hard disk drives, or by signals provided on a CD-ROM disk to be played in the CD-ROM drive shown in FIG. 1. The invention is broad enough to encompass any means of providing signals for TV display, with the signals integrated with a dynamic URL for allowing a user to browse the Internet WWW as a result of interacting with an enhanced entity in a frame of a TV display.

Still further, there are many ways the functionality of the control routines required for such an apparatus, for stripping interframe data and for accomplishing browsing in response to dynamic URLs, may be provided. It is well known in the computer arts that specific functionality may be provided by control routines written in a variety of ways. It is not the specific order of code that is unique, however, rather the functionality that the code provides for the apparatus.

There are a large body of potential applications for the invention described in several embodiments herein. Each of such applications may be regarded as a new embodiment of the present invention rather than as a new invention.

There are, in addition, many formats for display of WEB pages with simultaneous display of TV programming, and the many variations possible simply attest to the breadth of the present invention.

What is claimed is:

1. A video data stream, sent in successive frames, for providing a dynamic video display on a display monitor, comprising:

a first image frame data region providing a visual entity in a specific first position in the display; and first relational data associated with the first image frame data region, relating the first position to a URL;

a second image frame data region providing the visual entity in a second specific position other than the first specific position in the display, and second relational data associated with the second image frame data region, relating second position of the visual entity to the URL.

2. A video data stream as in claim 1 comprising analog television signals wherein the relational data is interposed in an interval between the image frame data regions.

3. A video data stream as in claim 1 comprising digital television data wherein the relational data is integrated directly in the image frame data regions.

4. A video data stream as in claim 1 further comprising information integrated directly in the image frame data regions adapted for causing the visual entity to be visually enhanced in the display.

5. A video data stream as in claim 4 wherein enhancement of the visual entity is by alteration of one or both of brightness and contrast.

6. A video data stream as in claim 4 wherein enhancement of the visual entity comprises alteration of color signals at the position of the visual entity.

7. A system for TV transmission providing an active video display for television programming, comprising:

a source providing a video data stream sent in successive frames, including:

a first image frame data region providing a visual entity in a specific first position in the display; and first relational data associated with the first image frame data region, relating the first position to a URL; and a second image frame data region providing the visual entity in a second specific position other than the first specific position in the display; and second relational data associated with the second image frame data region, relating the second position of the visual entity to the URL;

receiving and display apparatus adapted for receiving and displaying the image frame data on a display monitor, the receiver and display apparatus comprising also an Internet Browser; and selection apparatus for selecting the visual entity in the active video display;

wherein selecting the visual entity in the active video display activates the Internet Browser, accesses a World Wide Web page addressed by the URL, and displays the page on the display monitor.

8. A system as in claim 7 wherein more than one visual entity in the active video display is associated with a URL.

9. A system as in claim 7 wherein the visual entity is enhanced in the active video display to indicate to a viewer that the visual entity is associated with a URL.

10. A system as in claim 9 wherein the enhancement is by one of adjusting brightness or contrast, by adjusting color, or by adding an outline to the visual entity.

11. A system as in claim 7 wherein the source is a broadcast transmitter broadcasting a TV signal.

12. A system as in claim 7 wherein the source is a Video Cassette Recorder (VCR) playing a VCR tape.

13. A system as in claim 7 wherein the source is a CD-ROM drive playing a CD-ROM disk.

14. A system as in claim 7 wherein the source comprises a computer apparatus retrieving and transmitting a video data stream from a hard disk drive.

15. A system as in claim 7 wherein the WEB page is displayed as a movable and adjustable window on the display monitor.

16. A receiving and display apparatus comprising:
   computerized control circuitry;
   an Internet browser;
   display circuitry;
   a display monitor; and
   receiving and processing circuitry adapted for receiving and processing a dynamic video data stream sent in successive frames, and providing therefrom an active video display having a moving visual entity therein, the moving visual entity associated with a moving region in the display, and the moving region in the display associated with a single URL;
   wherein the control circuitry provides a selection mechanism adapted for a user to select the moving region in the display associated with the visual entity, and upon selection causes the Browser to access the Internet source, and to download and display a WEB page having the URL.

17. The apparatus of claim 16 comprising multiple URLs associated each with a different specific entity image in the display.

18. The apparatus of claim 16 wherein the WEB page is displayed as a movable and adjustable window in the display.

19. A signal preparation and transmission apparatus for providing a video data stream sent in successive frames comprising:
   imaging apparatus for monitoring a scene and preparing a signal data stream therefrom, the data stream comprising a first image frame data region providing a visual entity in a specific first position in the display; and first relational data associated to the first image frame data region, relating the first position to a URL;
   a second image frame data region providing the visual entity in a second specific position other than the first specific position in the display; and second relational data associated with the second image frame data region, relating the second position of the visual entity to the URL; and
   control circuitry adapted for adding an Internet Universal Resource Locator (URL) to the data stream and for associating the URL with the visual entity in one or more of the image frames.

20. The apparatus of claim 19 wherein the control circuitry adds more than one URL each associated with a different visual entity.

21. The apparatus of claim 19 wherein the control circuitry adds data to the data stream to visually enhance the visual entity in a display provided by the data stream.

22. The apparatus of claim 21 wherein the enhancement is by one or more of adjusting brightness, contrast, or color.

23. A method for providing association of a moving visual entity in a broadcast image with an Internet Universal Resource Locator (URL), comprising steps of:

(a) preparing a video data stream having successive frames comprising image frame data and relational data from a scene using a visual imaging apparatus; and (b) inserting the URL and data relating the URL with a position of the visual entity in each frame in the data stream.

24. The method of claim 23 wherein step (b) is performed in editing pre-recorded image data.

25. The method of claim 23 wherein step (b) is performed automatically in a live broadcast by computerized apparatus coordinated with the visual imaging apparatus.

26. The method of claim 23 further comprising a step for inserting data for enhancing display of the visual entity.

27. The method of claim 26 wherein the enhancement is by adjustment of one or more of color, brightness, or contrast in the display.

28. A method for accessing additional information related to a moving visual image entity in a video display, comprising steps of:

(a) associating the moving visual image entity with a dynamic Universal Resource Locator (URL) in a data stream including image frames for the video display, the data stream comprising a first image frame data region providing the visual entity in a specific first position in the display; and first relational data associated to the first image frame data region, relating the first position to a URL, a second image frame data region providing the visual entity in a second specific position in the display; and second relational data associated with the second image frame data region, relating the second position of the visual entity to the URL;

(b) selecting the visual entity in the video display by user input:

(c) accessing the Internet via a Network Interface Module (NIM) in response to the user input, and connecting to the data source associated with the URL;

(d) downloading a WEB page from the data source; and (e) displaying the WEB page in the video display.

29. The method of claim 28 wherein the WEB page is displayed in the video display as a movable and adjustable window.

30. The method of claim 28 wherein user selection is by cursor manipulation and selection with a pointer device.

31. The method of claim 28 wherein multiple visual image entities are associated each with a unique URL, and more than one WEB page is accessed and displayed by selecting more than one visual image entity.

32. A method for associating an individual visual entity in a video display with an Internet Universal Resource Locator (URL), the video display provided as successive frames to a display monitor, comprising steps of:

(a) noting the position of the visual entity in the display in individual ones of the successive frames;

(b) associating an areal region of the display in each of the individual ones of the successive frames with the position of the visual entity; and (c) associating the areal region for each of the individual ones of the successive frames with the URL.

33. A video data stream adapted for providing a moving image entity in a video display associated with an Internet URL, wherein the moving image entity in successive frames is associated with an areal region in each frame, and the areal region in each frame is associated with the URL.

34. A system for providing a video television display comprising:

a source providing a video data stream having image data organized in successive frames and providing a moving visual entity in the television display, the moving visual entity associated in the video data with an area in the display and the area associated in the video data with an Internet URL;

receiving and display apparatus, adapted for receiving the video data and providing the television display therefrom, including the moving visual entity;

selection apparatus adapted for a user to select the moving visual entity in the television display; and an Internet browser system including a browser application and an Internet access link;

wherein, upon selection of the moving visual entity by the user, the system initiates the Internet Browser application, accesses the Internet, and downloads and displays a WEB page associated with the URL.

* * * * *